United States Patent [19]

Hiraga

[11] 4,121,841

[45] Oct. 24, 1978

[54] DRIVE SHAFT SEAL FOR COMPRESSOR HOUSING

[75] Inventor: Masaharu Hiraga, Isesaki, Japan

[73] Assignee: Sankyo Electric Co., Ltd., Tokyo, Japan

[21] Appl. No.: 693,216

[22] Filed: Jun. 4, 1976

Related U.S. Application Data

[63] Continuation of Ser. No. 541,078, Jan. 15, 1975, abandoned.

[30] Foreign Application Priority Data

Jan. 17, 1974 [JP] Japan .................................. 49-8717
Jan. 17, 1974 [JP] Japan .................................. 49-8718

[51] Int. Cl.² ............................................. F16J 15/34
[52] U.S. Cl. .................................... 277/38; 277/93 SD
[58] Field of Search ............... 277/38, 92 R, 136, 93, 277/93 SD

[56] References Cited

U.S. PATENT DOCUMENTS

| | | | |
|---|---|---|---|
| 2,481,553 | 9/1949 | Williams | 277/136 |
| 2,984,507 | 5/1961 | Welch | 277/136 |
| 3,101,200 | 8/1963 | Tracy | 277/93 |
| 3,540,742 | 7/1967 | Tracy | 277/136 |
| 3,776,560 | 12/1973 | Wentworth | 277/93 R |

*Primary Examiner*—Robert I. Smith
*Attorney, Agent, or Firm*—Carothers and Carothers

[57] ABSTRACT

A shaft seal arrangement in a bore of a compressor housing through which a drive shaft extends, which comprises a first seal sheet fitted into the bore and a second seal sheet mounted on the drive shaft which are secured in position on the shaft by a retainer ring means, the indention comprising: a means for mechanically connecting the first seal sheet with the internal wall of the bore to prevent the first seal sheet from rotating. The means for mechanically connecting the first seal sheet with the internal wall comprises a key loosely fitted into a hole which is defined by an axial groove in the internal surface of the bore and an axial groove in the peripheral surface of the seal sheet. Alternatively, the mechanically connecting means may comprise a projection formed to the retainer ring, which projection is engaged with a depression formed in the first seal sheet thereby to prevent the first seal sheet from rotating.

2 Claims, 7 Drawing Figures

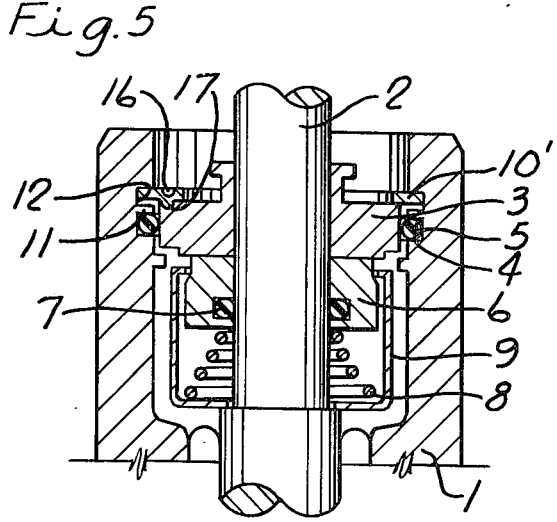
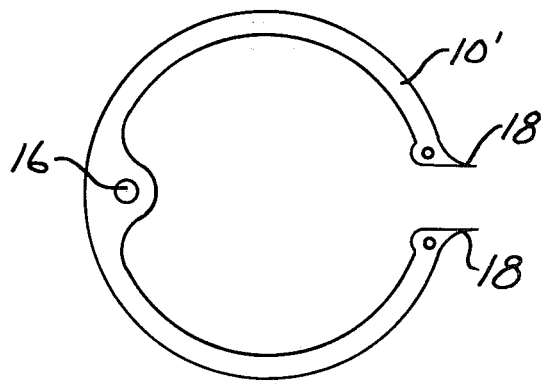
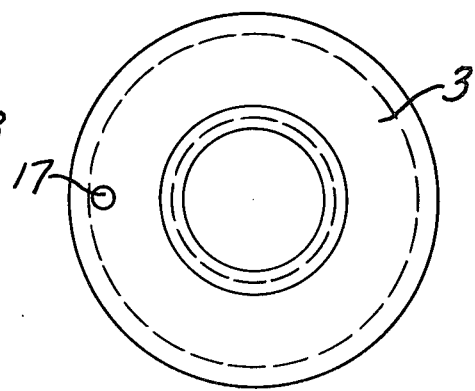

DRIVE SHAFT SEAL FOR COMPRESSOR HOUSING

This is a continuation of application Ser. No. 541,078 filed Jan. 15, 1975.

BACKGROUND OF THE INVENTION

This invention relates to a seal for fluid processing apparatus and, in particular, to a shaft seal arrangement for a bore of a compressor housing through which a drive shaft extends.

In an air compressor or other fluid compressor including a cylinder and a piston in a compressor housing, the housing is provided with a bore though which a drive shaft extends to transmit the driving power to the piston from any power source, such as an electric motor or an internal combustion engine.

A shaft seal in the bore of the housing is important to prevent the processed fluid from leaking.

Such a shaft seal arrangment is disclosed in U.S. Pat. No. 3,761,202, FIG. 3.

This shaft seal arrangement comprises a first seal sheet fitted into the bore of the compressor housing, a second seal sheet mounted on the drive shaft and pressed to the first seal sheet and a retainer ring fixed to the inner wall of the bore to prevent axial movement of the first seal sheet by the pressure of the second seal sheet.

The retainer ring may be a snap ring fitted into an annular groove formed in the internal surface of the bore.

According to this shaft seal arrangement, the rotation of the first seal sheet is prevented by the friction between the first seal sheet and the internal surface of the bore and the retainer ring, but rotation is not sufficiently prevented.

SUMMARY OF THE INVENTION

An object of the present invention is to provide an improved shaft seal arrangement in which any rotation of the first seal sheet does not occur.

Another object of this invention is to provide a shaft seal arrangement which includes means for mechanically connecting the first seal sheet with the internal wall of the bore to prevent the rotation of the first seal sheet.

According to an aspect of this invention, a shaft seal arrangement is provided at a bore of a compressor housing, through which a drive shaft extends, and comprises a first seal sheet fitted into the bore, a second seal sheet mounted on the drive shaft and pressed to the first seal sheet, and a retainer ring fixed to the inner wall of the bore to prevent axial movement of the first seal sheet by the pressure of the second seal sheet, and which is characterized by a key means loosely fitted into an axial hole which is defined by a depression formed in the peripheral side surface of the first seal sheet and an axial groove formed in the internal surface of the bore.

In another aspect of this invention, the retainer ring has a projection projecting towards the first seal sheet, which projection is received in a corresponding depression formed in the surface of the first seal sheet. In this aspect, if the retainer ring is a snap ring fitted into an annular groove formed in the internal surface of the bore, the snap ring is provided with pawl means projecting outwards therefrom, which pawl means bites the bottom of the annular groove to prevent rotation of the snap ring.

Further objects and features of this invention will be understood from the following descriptions of this invention in connection with preferred embodiments of this invention in reference to the annexed drawings.

BRIEF DESCRIPTION OF THE DRAWINGS

FIG. 5 shows a sectional view of another embodiment of this invention,

FIG. 6 shows a plan view of a snap ring used in the embodiment in FIG. 5, and

FIG. 7 shows a plan view of a first seal sheet used in the embodiment in FIG. 5.

DETAILED DESCRIPTION OF PREFERRED EMBODIMENT

Figure 1:
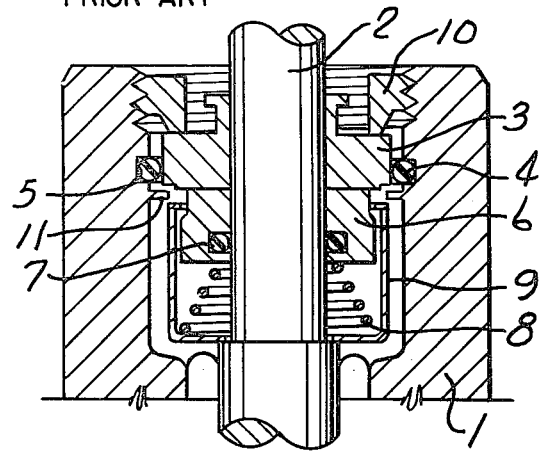
FIG. 1 shows a sectional view of a known shaft seal arrangement.

Referring to FIG. 1, which shows a known shaft seal arrangement at a bore of a compressor housing 1 through which a drive shaft 2 extends, a first seal sheet 3 is fitted into the bore and is tightly supported by an O-ring 4 which is fitted in an annular groove 5 formed in the internal surface of the bore. The first seal sheet 3 has a central opening through which the drive shaft 2 extends.

A second seal sheet 6 is supported on the drive shaft 2 by means of an O-ring 7 against the inner side of the first seal sheet 3. The second seal sheet 6 is pressed to and is in contact with the first seal sheet 3 by means of a coil spring 8.

The coil spring 8 is enclosed in a retainer cover 9 which is secured on the drive shaft 2.

A retainer ring 10 is fixed to the internal wall of the bore at the outer side of the first seal sheet 3 to prevent axial movement of the first seal sheet 3 in the outward direction of the housing 1.

An annular rib 11 which radially projects from the inner surface of the bore, is to maintain the first seal sheet at its own axial position in assembling the shaft seal arrangement.

The retainer ring 10 is provided with external threads which mate with the threads formed in the internal surface of the bore.

Figure 2:
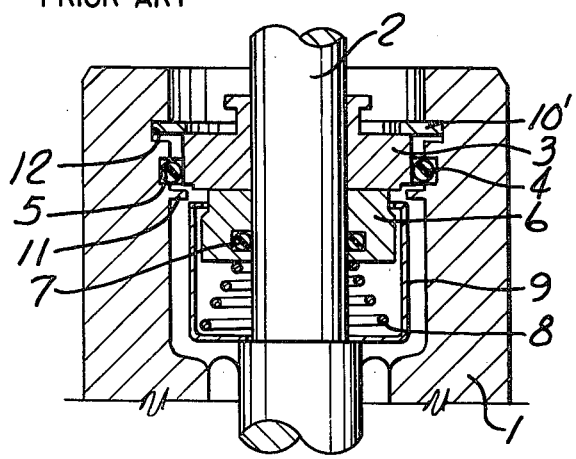
FIG. 2 shows a sectional view of another known shaft seal arrangement.

Referring to FIG. 2, another known shaft seal has a similar arrangement except that a snap ring 10', instead of the retainer ring 10, is fitted into an annular groove 12 formed in the internal surface of the bore. Same reference numerals represent similar parts as in FIG. 1.

When the drive shaft 2 is rotated to operate the compressor, the second seal sheet 6 is rotated together with the drive shaft 2, but the first seal sheet 3 is prevented from rotation by the friction between the first seal sheet 3 and the O-ring 4 and by the friction between the first seal sheet 3 and the retainer ring 10 (FIG. 1) or the snap ring 10' (FIG. 2).

But these friction elements are not adequately sufficient to prevent the rotation of the first seal sheet 3 when increased torque is applied to the first seal sheet 3.

For example, when the compressor is actuated after the long inoperative period, the first seal sheet 3 suffers an increased torque and is rotated because the first seal sheet 3 adheres to the second seal sheet 6 due to cured lubricant existing between these two seal sheets.

The rotation of the first seal sheet results in wear of the O-ring 4 such that leakage of the fluid occurs.

It is very important to prevent the rotation of the first seal sheet 3 even if increased torque is applied to the first seal sheet.

The main object of this invention is to realize such requirement.

Figure 3:
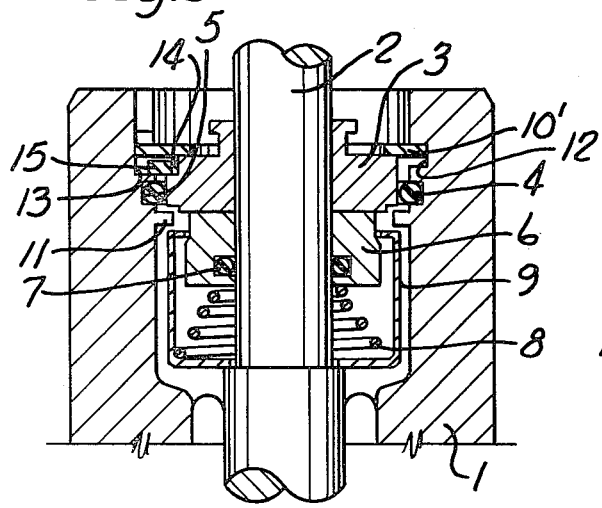
FIG. 3 shows a sectional view of an embodiment of this invention.
Figure 4:
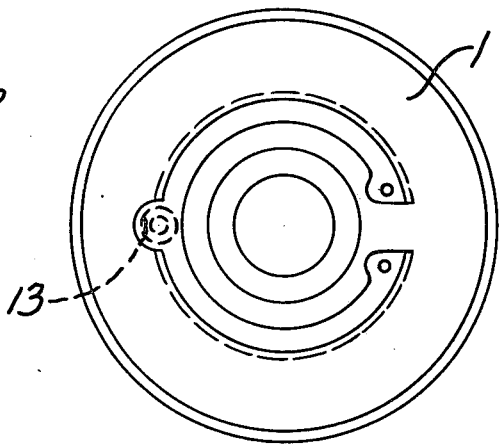
FIG. 4 shows a plan view of an embodiment in FIG. 3.

Referring to FIGS. 3 and 4, which show an embodiment wherein this invention is applied to the shaft seal arrangement in FIG. 2, the shaft seal of the present invention is characterized in that an axial groove 13 is formed in the internal surface of the bore, a depression 14 being formed in the peripheral side surface of the first seal sheet 3 and a key 15 being loosely fitted into a hole defined by the groove 13 and the depression 14.

The remaining arrangement of elements is similar to that shown in FIG. 2 and the same reference numerals are therefore used for similar parts.

In this embodiment, even if increased torque is applied to the first seal sheet 3, the first seal sheet 3 is not rotated because it is mechanically connected by the key 15.

Of course, the axial groove 13 and the depression 14 must be provided at axial locations on the outer side of the O-ring 4 to secure sealing of the first seal sheet 3.

The mechanical connection applied between the internal wall of the bore and the first seal sheet is similar to the shaft seal arrangement shown in FIG. 1.

Referring to FIGS. 5, 6 and 7, which show another embodiment wherein this invention is also applied to the shaft seal arrangement shown in FIG. 2, the shaft seal is characterized in that a projection 16 is formed on the snap ring 10' which projects toward the first seal sheet 3, a corresponding depression 17 being formed in the surface of the first seal sheet 3 to receive the projection 16.

The snap ring 10' may be provided with pawls 18 which bite the bottom of the annular groove 12 and thereby is prevented from rotation.

The remaining arrangement of elements is similar to that shown in FIG. 2 and its description, therefore, is omitted.

According to this arrangement, rotation of the first seal sheet 3 is prevented because the first seal sheet 3 is mechanically connected to the internal wall of the bore by the engagement of the depression 17 and the projection 16, even if increased torque is applied to the first seal sheet 3.

A similar mechanical connection may also be employed between the first seal sheet 3 and the retainer ring 10 in FIG. 1.

This invention has been described in reference to special embodiments, but it will be understood by those skilled in the art that this invention is not restricted to those embodiments as above described, but various modifications and other designations may also be made within the scope of this invention.

I claim:

1. A shaft seal arrangement at a bore of a compressor housing through which a drive shaft extends, which comprises
   a compressor housing having an annular bore therethrough of uniform diameter which opens at one end thereof externally of said housing,
   a drive shaft extending through said bore to the outside of said housing,
   a first seal sheet in said bore and having a central opening through which said drive shaft extends,
   a first O-ring disposed between a peripheral surface of said first seal sheet and the internal surface of said bore to prevent leakage therebetween,
   a second seal sheet mounted internally of said first seal sheet on said drive shaft with said second seal sheet pressed in contact with said first seal sheet to prevent leakage between said first and second seal sheets,
   a second O-ring disposed between an inner surface of said second seal sheet and said drive shaft to prevent leakage therebetween,
   a snap ring fitted into an annular groove formed in the internal surface of said bore with said first seal sheet pressed in contact with said snap ring to retain said seal sheets in said bore,
   a projection on said snap ring extending in the axial direction and received in a corresponding depression in said first seal sheet to prevent relative rotation between said first seal sheet and said snap ring, and
   two pawls projecting radially outward from said snap ring and engaging the bottom of said annular groove under bias of said snap ring to prevent rotation of said snap ring and in turn rotation of said first seal sheet.

2. A shaft seal arrangement comprising, a compressor housing having an annular bore therethrough of uniform diameter which opens at one end thereof externally of said housing, a drive shaft extending through said bore, a first seal sheet in said bore and having a central opening through which said drive shaft extends, a first O-ring disposed between a peripheral surface of said first seal sheet and the internal surface of said bore to prevent leakage therebetween, a second seal sheet mounted internally of said first seal sheet on said drive shaft with said second seal sheet pressed in contact with said first seal sheet to prevent leakage between said first and second seal sheets, a second O-ring disposed between an inner surface of said second seal sheet and said drive shaft to prevent leakage therebetween, a snap ring fitted into an annular groove formed in the internal surface of said bore, said snap ring contacting an external surface of said first seal sheet to retain said seal sheets within said bore and having a projection directed toward said first seal sheet, a corresponding depression in an external surface of said first seal sheet receiving said projection of said snap ring, and two pawls projecting outward from said snap ring and biting an internal surface of said annular groove.

* * * * *